E. M. GRAHAM.
JAWS FOR CHUCKS.
APPLICATION FILED JULY 24, 1911.
1,017,408.
Patented Feb. 13, 1912.
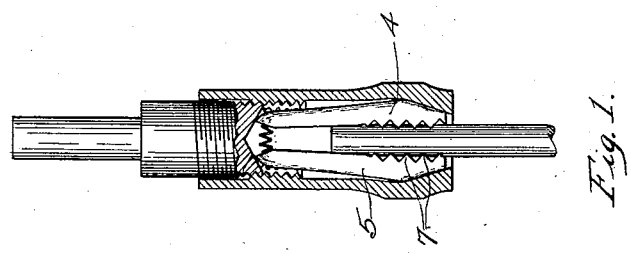
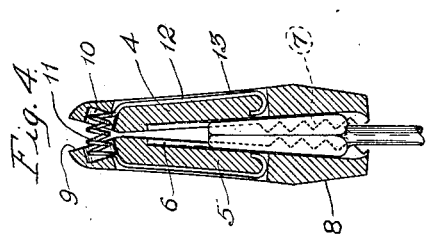 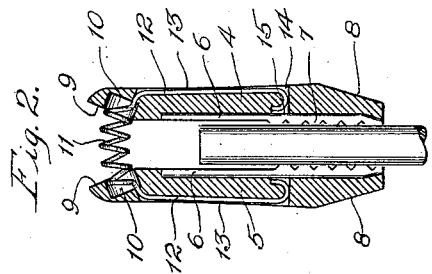
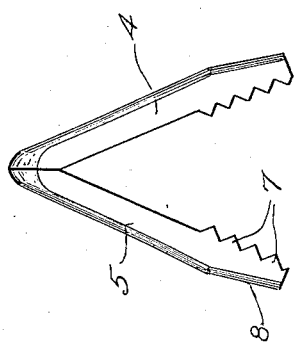
Witnesses:
Ephraim Banning.
Thos. A. Banning Jr.
Inventor:
Edward M. Graham.
By Banning & Banning
Attorneys.

UNITED STATES PATENT OFFICE.

EDWARD M. GRAHAM, OF CHICAGO, ILLINOIS, ASSIGNOR TO VAUGHAN & BUSHNELL MANUFACTURING COMPANY, OF CHICAGO, ILLINOIS, A CORPORATION OF ILLINOIS.

JAWS FOR CHUCKS.

1,017,408.        Specification of Letters Patent.        Patented Feb. 13, 1912.

Application filed July 24, 1911. Serial No. 640,197.

*To all whom it may concern:*

Be it known that I, EDWARD M. GRAHAM, a citizen of the United States, residing at Chicago, in the county of Cook and State of Illinois, have invented certain new and useful Improvements in Jaws for Chucks, of which the following is a specification.

This invention relates to an improvement in jaws for chucks intended particularly for gripping drills having round shanks and of comparatively small size, although, as will presently appear, it is in nowise restricted to such use. It is intended to provide a set of jaws which, by reason of their construction and relative arrangement, can adapt themselves to drill chucks of different sizes, always with the assurance that the drill will be gripped by the jaws throughout the entire length of the gripping surface of the jaws.

I am aware of certain constructions intended to accomplish similar results to those obtained by my present invention, but it is believed that the jaws herein shown and described possess certain advantages over any similar device with which I am familiar.

In the drawings, Figure 1 illustrates the jaws of my invention, placed within a suitable form of chuck and gripping a drill of comparatively large size; Fig. 2 is a cross section through the jaws in the position which they assume when gripping a drill of uniform size; Fig. 3 is a side elevation of the jaws in their normal position; and Fig. 4 is a cross-section through the jaws in the position which they assume when gripping a drill having a tapered square head.

As above stated, this invention relates to the jaws themselves, and for this reason I am not particularly concerned with the form of the chuck with which they may be used. However, for the purpose of showing a complete operative device, I have illustrated the jaws in the position which they assume within a chuck of well known construction.

The two jaws are designated by the numerals 4 and 5. They are of practically the same construction, and so it will suffice to describe only one of them. Along its inner face the jaw is provided with a longitudinal channel 6, the sides of the forward end of which are serrated to provide a number of teeth 7. The forward end of the outer portion of each jaw is beveled as at 8, which bevel co-acts with a suitable surface of the chuck for securing the gripping action. The rear end of each jaw is beveled outwardly, as shown at 9, so that when the jaws set together in the normal manner they are extended apart, as shown in Fig. 3. A socket 10 extends inwardly at substantially right angles from each of the surfaces 9. A helical spring 11 extends between the sockets and has each end 12 extended through one of the jaws to the outer face thereof. The outer face of each jaw is provided with a longitudinal channel 13, the lower end of which communicates with a hole 14 extending through to the inner face of the jaw and turned up to provide a pocket 15. The corresponding end 12 of the spring is extended down along the channel 13 and passed through the jaw at the point 14 and upturned into the socket 15. In this manner a very secure connection is effected between each end of the spring and the corresponding jaw. Inasmuch as the spring is of helical shape, it tends to draw the ends of the jaws together and at the same time to straighten out so as to assist in throwing the jaws apart at an angle to each other. Therefore, the spring itself, by reason of its helical form, assists the beveled faces 9 in throwing the jaws into the position shown in Fig. 3.

When the jaws are placed in a chuck, they are forced firmly together in their forward ends, and the spring tends to draw them together in their rear ends, so that there is established a very firm grip on the drill shank. In other words, the spring performs a double function, in that it tends to spread the jaws apart, as shown in Fig. 3, and in that it tends to draw their rear ends together to assist in gripping the drill.

Fig. 4 shows the jaws clamping the square head of a bit, the faces of which are not parallel. It shows how the jaws can assume an angle with respect to each other, permitting them to secure a firm even pressure on the head of the bit. Although a bit having a square head is shown in Fig. 4, still it is evident that the jaws could accommodate a round, tapered drill in a similar manner.

I claim:

1. The combination of a pair of co-acting jaws, having oppositely disposed inwardly extending sockets in their upper portions and channeled in their outer portions for the reception of spring arms, and a helical spring entered within the sockets, and having each arm extending through a jaw from the socket to the channel thereof, and lying within the channel and having the end of the arm secured to the corresponding jaw, substantially as described.

2. The combination of a pair of co-acting jaws, having oppositely disposed sockets in their upper portions extending inwardly at substantially right angles to the socketed faces of the jaws, and having elongated channels in the outer faces of the jaws and in communication with the sockets, and a coiled spring lying within the sockets and having its arms extended through from the sockets and lying in the channels, and having the end of each arm secured to the corresponding jaw, substantially as described.

3. The combination of a pair of jaws, having their upper portions oppositely socketed and provided with perforations extending from the sockets to the outer faces of the jaws, and a coiled spring lying within the sockets and having its arms extended through the perforations to the outer faces of the jaws, and having the ends of the arms secured to the jaws, substantially as described.

4. The combination of a pair of co-acting jaws, having their upper portions beveled away from each other, each jaw being provided with a socket extending inwardly from the corresponding beveled face and substantially at right angles thereto, and each jaw being provided with a perforation extending from the corresponding socket to its outer face, and a coiled spring lying within the sockets and having its ends extended through the perforations to the outer faces of the jaws, whereby, when the spring is in normal condition, the socketed ends of the jaws are drawn together and the spring is straightened to throw the jaws at an angle to each other, substantially as described.

EDWARD M. GRAHAM.

Witnesses:
THOMAS A. BANNING, Jr.,
FRANCES M. FROST.

---

Copies of this patent may be obtained for five cents each, by addressing the "Commissioner of Patents, Washington, D. C."